Feb. 7, 1928.
D. D. ORMSBY
1,658,571
DIFFERENTIAL
Filed Jan. 16, 1926
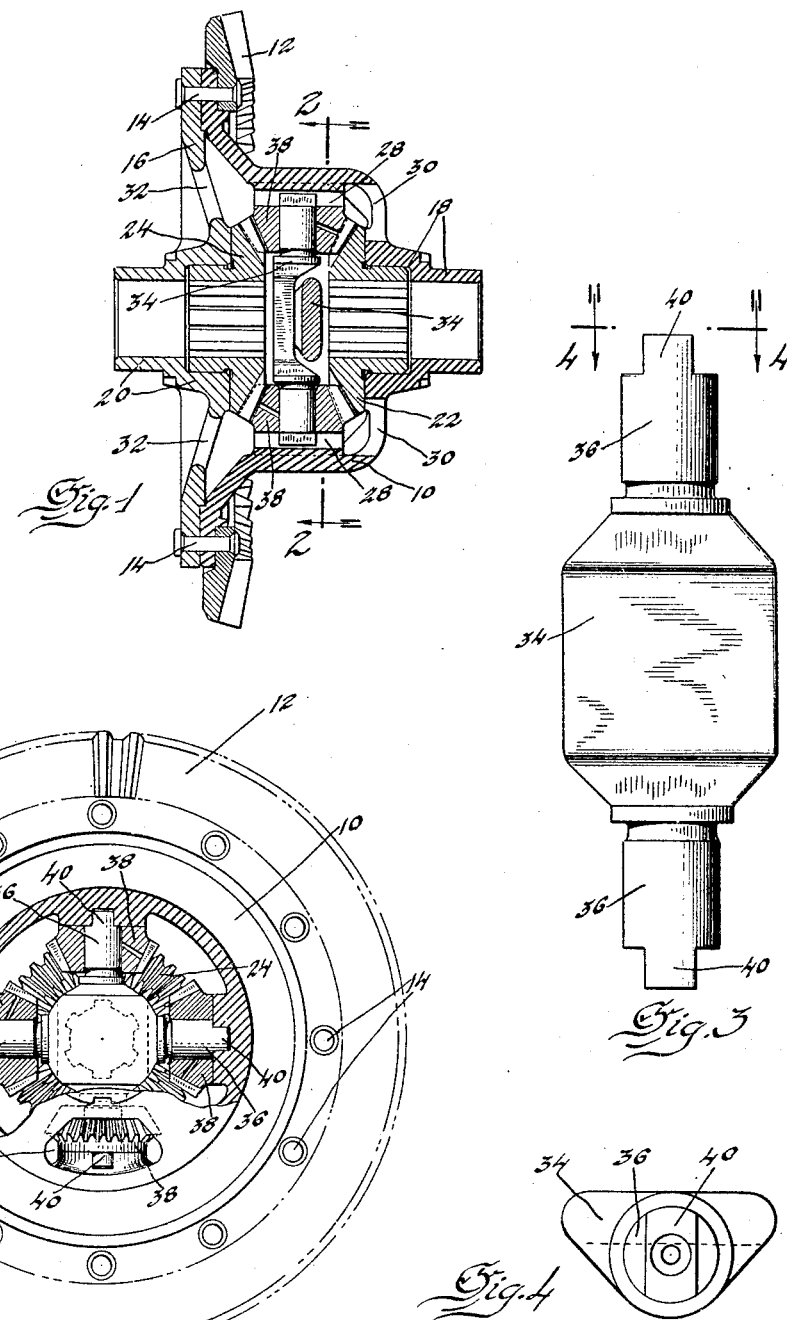
INVENTOR
Donald D. Ormsby
BY
Blackmore, Spencer & Flint
ATTORNEYS Patented Feb. 7, 1928.

1,658,571

UNITED STATES PATENT OFFICE.

DONALD DAMON ORMSBY, OF SYRACUSE, NEW YORK, ASSIGNOR TO GENERAL MOTORS CORPORATION, OF DETROIT, MICHIGAN, A CORPORATION OF DELAWARE.

DIFFERENTIAL.

Application filed January 16, 1926. Serial No. 81,740.

This invention relates to differentials, and is illustrated as embodied in an automobile differential having a novel mounting for the differential pinions. An object of the invention is to lower the cost of an accurately-made differential, by eliminating most of the machine work ordinarily necessary in finishing the usual pinion-carrying spider, and in mounting it with sufficient accuracy in the differential casing.

Having this object in view, in place of the spider of the usual differential assembly, the pinions are mounted on a cross shaft having its ends mounted in grooves broached or otherwise cut on the inside of the differential casing, parallel to its axis. Preferably the shaft has flattened ends slidably floating in diametrically-opposite grooves in the casing, the pinions being journaled on the shaft in mesh with the side gears. In one desirable arrangement there are two cross shafts at right angles to each other, oppositely recessed at their centers to cross without interference, and each having its ends floating in a pair of the described grooves, there being in the illustrated construction four differential pinions journaled on the cross shafts.

The above-described grooves are very easily and accurately cut by broaching right through the casing, openings being provided to permit of this operation. The shafts also require much less careful machine work than does the conventional spider, in that the only parts whose accuracy is of importance are the guiding ends and the pinion bearings, and these parts for the different pinions do not require the accurate finishing relatively to each other that is essential in the case of a rigid spider.

The above and other objects and features including various novel and desirable details of construction, will be apparent from the following description of one illustrative embodiment of the invention shown in the accompanying drawings, in which:

Figure 1 is a section in a plane passing through the axis of the differential;

Figure 2 is a side elevation, partly broken away in section on the line 2—2 of Figure 1;

Figure 3 is a side elevation of one of the cross shafts; and

Figure 4 is an end elevation of the cross shaft.

The differential shown includes a casing 10 having a flange to which is secured a ring gear 12 by bolts 14 which also hold an end plate 16 which in effect forms part of the casing. Casing 10 and plate 16 are formed with axial projections 18 and 20, in which are journaled side bevel gears 22 and 24 splined to axially-inserted live axles (not shown).

The casing is formed with two pairs of diametrically-opposite parallel-sided grooves 28, arranged at right angles to each other. The casting from which the casing is made is formed with openings 30 opposite the bosses in which the grooves are formed, to permit the passage of a broaching tool right through the casing from one side to the other in making these grooves. Plate 16 may also have openings 32 opposite openings 30.

Cross shafts 34, one of which is shown separately in Figures 3 and 4, are provided with cylindrical portions 36 serving as bearings for the differential pinions 38 meshing with side gears 22 and 24, and with flattened parallel-sided ends 40 slidably floating in the grooves 28, the shafts being positioned in the grooves only by the pressure of the pinions 38 against side gears 22 and 24. The centers of these shafts are flattened, to make them stronger and to serve as abutments for the inner ends of the live axle sections, and are oppositely recessed as shown in Figure 1, so that they do not interfere with each other. Ordinarily the two shafts 34 will be made identical, the one merely being turned around with respect to the other.

In assembling the differential, gear 22 is inserted first, then the right-hand shaft 34 with its pinions is slid into place, then the other shaft 34 and its pinions are slid in, gear 24 is inserted in plate 16 and this plate with the gear 24 is set in place, ring gear 12 is added, and bolts 14 inserted and tightened up to hold the entire assembly. It will be observed that the shafts 34 are much more easily inserted than is the usual pinion spider, thus facilitating assembly.

While one illustrative embodiment has been described in detail, it is not my intention to limit the scope of the invention to that particular embodiment, or otherwise than by the terms of the appended claims.

I claim:

1. A differential comprising, in combination, a casing including a generally cylindrical body formed with pairs of internal grooves parallel to its axis, side bevel gears in the casing, cross shafts having flattened ends sliding between the parallel walls of the grooves, and differential bevel pinions journaled on the shafts and meshing with the side gears, the shafts being constructed and arranged to cross at the center of the casing.

2. A differential comprising, in combination, a casing formed with two pairs of diametrically-opposite grooves parallel to its axis, side gears rotatable about the axis of the casing, two cross shafts having their ends floating respectively in the pairs of grooves, the shafts being oppositely recessed at their centers to cross each other, and differential pinions on the shafts meshing with the side gears.

3. A differential comprising in combination a casing having a ring gear and arranged to receive aligned live axles, bevel gears in the casing arranged to drive the axles, independent cross shafts in the casing between the bevel gears and guided for sliding movement axially of the casing, and pinions on the ends of the cross shafts meshing with said gears.

In testimony whereof I affix my signature.

DONALD D. ORMSBY.